(12) United States Patent
Prasad et al.

(10) Patent No.: US 7,018,172 B2
(45) Date of Patent: Mar. 28, 2006

(54) AIRFOIL SURFACE IMPEDANCE MODIFICATION FOR NOISE REDUCTION IN TURBOFAN ENGINES

(75) Inventors: Dilip Prasad, Vernon, CT (US); Bruce L. Morin, Springfield, MA (US); Wesley K. Lord, South Glastonbury, CT (US); Douglas C. Mathews, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 93 days.

(21) Appl. No.: 10/744,983

(22) Filed: Dec. 22, 2003

(65) Prior Publication Data

US 2005/0135924 A1    Jun. 23, 2005

(51) Int. Cl.
*F04D 29/66* (2006.01)

(52) U.S. Cl. .................. 415/119; 416/233; 416/500

(58) Field of Classification Search ................ 415/115, 415/119, 208.1, 209.1; 416/232, 233, 500
See application file for complete search history.

(56) References Cited

U.S. PATENT DOCUMENTS

| | | | | | |
|---|---|---|---|---|---|
| 3,820,628 | A | * | 6/1974 | Hanson | ............... 181/214 |
| 6,004,095 | A | * | 12/1999 | Waitz et al. | ............ 415/119 |
| 6,139,259 | A | | 10/2000 | Ho et al. | |

\* cited by examiner

*Primary Examiner*—Edward K. Look
*Assistant Examiner*—Dwayne J White
(74) *Attorney, Agent, or Firm*—Bachman & LaPointe, P.C.

(57) ABSTRACT

In accordance with the present invention, an aircraft engine is provided with a component which helps reduce the noise generated by the engine. The component has a first aerodynamic surface, a second aerodynamic surface, and a system for reducing noise without altering a pressure differential between the first aerodynamic surface and the second aerodynamic surface.

21 Claims, 2 Drawing Sheets

AIRFOIL SURFACE IMPEDANCE MODIFICATION FOR NOISE REDUCTION IN TURBOFAN ENGINES

STATEMENT OF GOVERNMENT INTEREST

The Government of the United States of America may have rights in the present invention as a result of Contract No. NAS3-98005 awarded by the National Aeronautics and Space Administration.

BACKGROUND OF THE INVENTION (a) Field of the Invention

The present invention relates to a component for use in a gas turbine engine, particularly turbofan engines, which component is provided with means for reducing noise generated by said engine.

(b) Prior Art

The noise generated by contemporary turbofan engines has a significant economic impact. This is because aircraft operations are restricted to specific times during the day which prevents, for instance, 24-hour use of freight carriers. A sizeable portion of this noise is tonal in nature and can be partially attributed to the unsteady aerodynamic interaction between the stator and wakes shed from the upstream rotor. As one increases bypass ratio, fan noise is likely to be the dominant source.

Past methods for the reduction of fan tone noise have included choosing blade/vane counts such that the fundamental mode is cut off, increasing rotor-stator spacing, and the use of acoustic linings in the inlet and exit fan ducts. Some of these techniques however may not always be applicable. Duct liners suffer from the drawback that the thickness required to provide significant noise attenuation may be quite large, resulting in large weight increase at high bypass ratios.

In the quest for techniques aimed towards tone noise reduction, it is crucially important that their effect on the mean flow be minimal. In particular, the amount of flow turning in the exit guide vane should not be affected, nor the flow losses enhanced to any significant extent, for this would result in degraded performance. Thus, the system shown in U.S. Pat. No. 6,139,259 to Ho et al., wherein the pressure and suction surfaces of the exit guide vane (or strut) communicate through small channels over the entire leading edge surface of the airfoil, is not feasible since it would alter both the mean and unsteady loading.

It is desirable to develop a system capable of producing large (predictable) changes in the unsteady loading, while having little effect on the steady loading.

SUMMARY OF THE INVENTION

Accordingly, it is an object of the present invention to provide an aircraft engine component which reduces noise in gas turbine engines.

It is a further object of the present invention to provide an aircraft engine component wherein the noise reduction means produces large (predictable) changes in the unsteady loading, while having little effect on the steady loading.

The foregoing objects are attained by the aircraft engine components in accordance with the present invention.

In accordance with the present invention, an aircraft engine component is provided which reduces noise in turbofan engines. The aircraft engine component broadly comprises having a first aerodynamic surface, a second aerodynamic surface, and means for reducing noise without altering a pressure differential between the first aerodynamic surface and the second aerodynamic surface.

Other details of the acoustic impedance modification for noise reduction in turbofan engines, as well as other objects and advantages attendant thereto, are set forth in the following detailed description and the accompanying drawings wherein like reference numerals depict like elements.

DETAILED DESCRIPTION OF THE PREFERRED EMBODIMENT(S)

The present invention is directed to the reduction of noise generated by gas turbine engine components. For example, the noise may be generated by the interaction of a rotor wake with a fan exit guide vane. The noise may also be generated by the interaction of potential fields, such as acoustic waves, with solid objects in the flow path. These solid objects include guide vanes, struts, and bifurcators.

Figure 1:
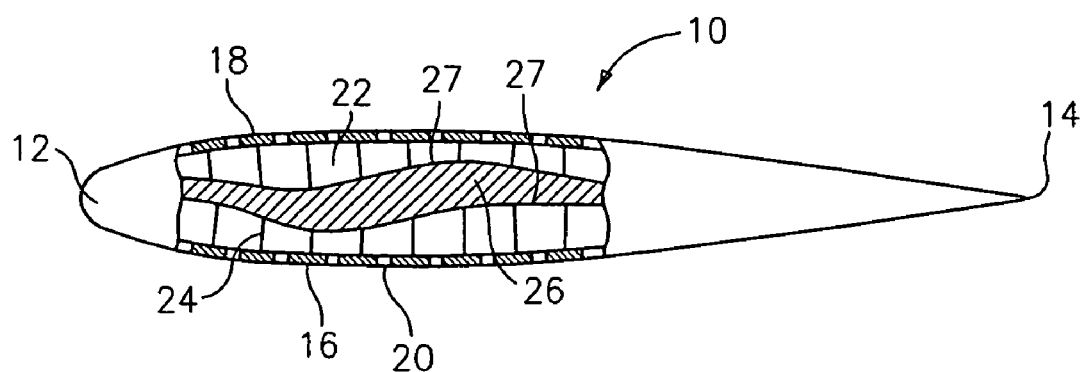
FIG. 1 illustrates a first embodiment of an engine component having means for reducing the noise generated by a gas turbine engine.

Referring now to the drawings, FIG. 1 illustrates a first embodiment of an engine component 10 having a means for reducing the noise generated by a gas turbine engine. The component 10 may be a vane or a blade used in the engine. As can be seen from FIG. 1, the component 10 has a leading edge 12, a trailing edge 14, and a first surface 16 and a second surface 18 which extend from the leading edge 12 to the trailing edge 14. Each of the surfaces 16 and 18 has a plurality of perforations or apertures 20. The component 10 is divided into a plurality of cells 22 by transverse elements 24 and a contoured backing 26. The contoured backing 26 may be an acoustic liner formed from any suitable metallic or non-metallic material known in the art. The depth of each cell 22 is varied by the shape of the backing 26 which varies in the chordwise direction.

In operation, a fluid, such as air, flows over the surfaces 16 and 18 and enters the cells 22. The presence of the backing 26 prevents the air from passing through the component 10 from one of the surfaces 16 and 18 to the other of the surfaces 16 and 18. As a result, the pressure differential which is created over the component 10 is not altered. The backing surface 27, which is comprised of compliance, resistance and inertance components, alters the unsteady response of the component 10 to impinging disturbances. Thus, by appropriately tuning the dimensions of the backing 20, the unsteady response can be so chosen as to reduce the amplitude of the acoustic waves scattered by the component 10.

While the backing 26 has been described as being variable in a chordwise direction, it should be noted that the backing 26 could also be varied in a spanwise direction. Furthermore, the chordwise and spanwise dependence of the perforated surface thickness and hole density/shape can also be used to control the surface impedance.

Figure 2:
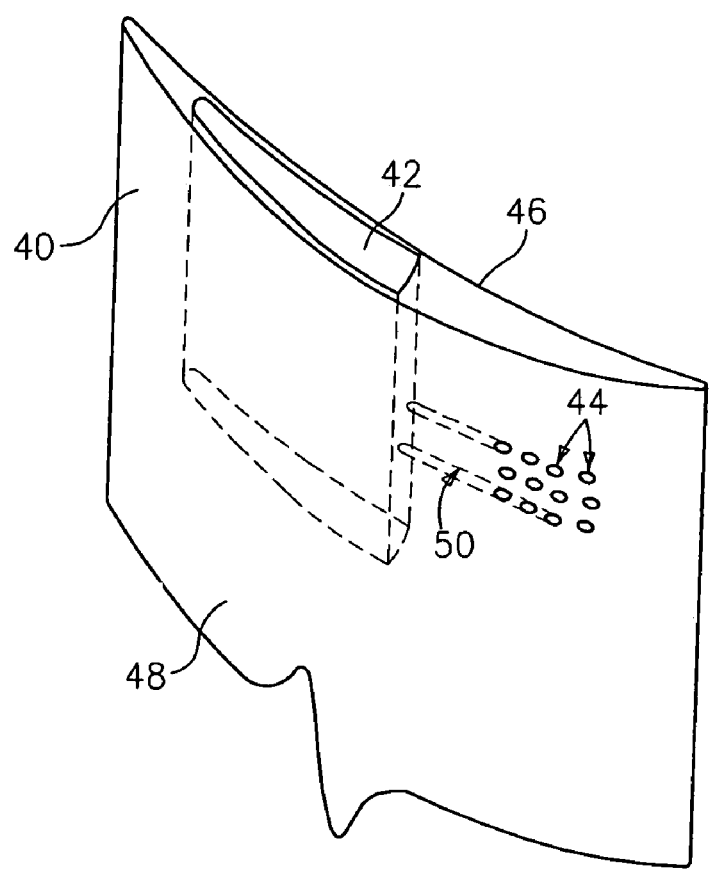
FIG. 2 illustrates a second embodiment of an engine component having means for reducing the noise generated by a gas turbine engine.

Referring now to FIG. 2, when the component is a thin airfoil, such as in the case of a fan exit guide vane, the use of an acoustic liner or backing such as that shown in FIG. 1 may not be feasible. Under these conditions, it is desirable to decouple the compliance from the resistance and inertance. FIG. 2 illustrates a fan exit guide vane 40 having an internal plenum 42 which provides the compliance. Holes 44 may be provided on the airfoil pressure surface 46 and/or the airfoil suction surface 48. Each of the holes 44 is connected to the plenum 42 by a series of discrete fluid passageways 50. As suggested in FIG. 2, the perforations may be confined to small portions of the airfoil surface 46 and/or 48. The optimum locations of these regions can be determined from the unsteady aerodynamic response of the blade row. Since there are no fluid passageways extending through the vane 40 from the surface 46 to the surface 48, the pressure differential over the surfaces 46 and 48 is not altered in any way. By providing the necessary compliance via the plenum 42, engine noise is reduced.

Figure 3:
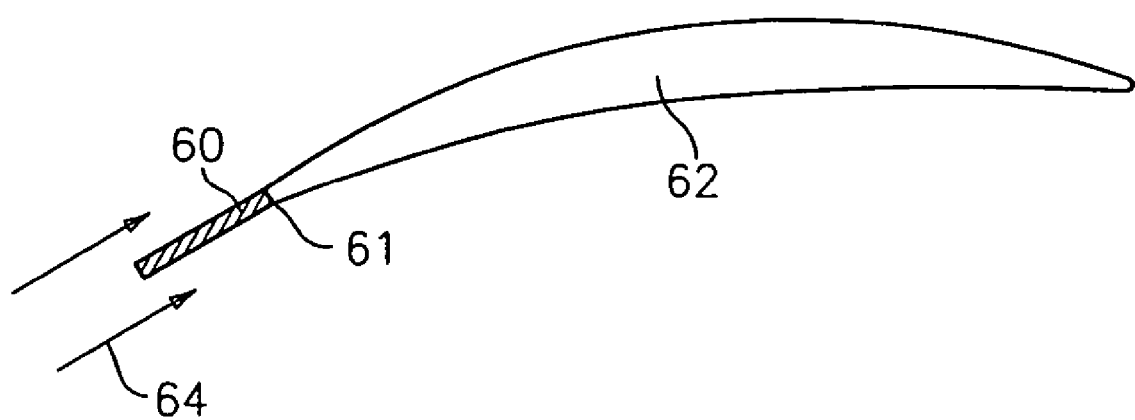
FIG. 3 illustrates a third embodiment of an engine component having means for reducing the noise generated by a gas turbine engine.

A third embodiment of a noise reduction technique is illustrated in FIG. 3. In this embodiment, a short length plate 60 of uncambered, porous material is attached to the leading edge 61 of an airfoil portion 62 of an engine component. The plate 60 is oriented parallel to the mean flow direction 64. Unlike the previous embodiments, the flows streams on either side of the plate 60 now communicate with each other. However, because of the orientation of the plate 60 along the inflow direction, its impact on the steady loading is minimal. Unsteady disturbance such as those induced by incoming rotor wakes will however be significantly affected by the impedance of the plate 60. This will have an effect on the unsteady airfoil loading and thus the noise that is generated. Despite a superficial resemblance to the device shown in U.S. Pat. No. 6,139,259 to Ho et al., the fundamental difference here is that the resistive element is not contained within the working portion of the airfoil, i.e. within the zone where flow turning occurs. As a result, the pressure differential over the airfoil portion of the component is maintained.

The three embodiments described herein illustrate the novel feature of the present invention, wherein the component surface impedance is tailored so as to alter the unsteady response of the airfoil to incident disturbances in such a manner that the scattered acoustic energy is lower than would be generated by the interaction of the same disturbance with an analogous impervious component.

It is apparent that there has been provided in accordance with the present invention an acoustic impedance modification for noise reduction in turbofan engines which fully satisfies the objects, means, and advantages set forth hereinbefore. While the present invention has been described in accordance with specific embodiments thereof, it should be apparent that alternatives, modifications and variations will become apparent to those skilled in the art having read the foregoing description. Accordingly, it is intended to embrace those alternatives, modifications, and variations as fall within the broad scope of the appended claims.

What is claimed is:

1. An aircraft engine component for reducing noise in turbofan engines, said component comprising a first aerodynamic surface, a second aerodynamic surface, and means for reducing noise without altering a pressure differential between the first aerodynamic surface and the second aerodynamic surface, said noise reducing means comprising said component having a plurality of cells, each said cell being bounded by one of said aerodynamic surfaces and having an opening for receiving a portion of a fluid flowing over said one aerodynamic surface, and means for preventing said fluid in said cells from flowing from said one aerodynamic surface to the other of said aerodynamic surfaces.

2. An aircraft engine component according to claim 1, wherein said fluid flow preventing means comprises a contoured backing element positioned intermediate said aerodynamic surfaces.

3. An aircraft engine component according to claim 1, wherein said component comprises a strut.

4. An aircraft engine component for reducing noise in turbofan engines, said component comprising a first aerodynamic surface, a second aerodynamic surface, and means for reducing noise without altering a pressure differential between the first aerodynamic surface and the second aerodynamic surface, said noise reducing means comprising a plurality of openings in each of said aerodynamic surfaces, a plenum positioned in a space defined by said aerodynamic surfaces, and at least one fluid passageway connected to said openings and said plenum so that a portion of said fluid flowing over said aerodynamic surfaces is introduced into said plenum.

5. An aircraft engine component according to claim 4, wherein said aerodynamic surfaces comprise an airfoil suction surface and an airfoil pressure surface.

6. An aircraft engine component according to claim 4, wherein each of said holes is connected to the plenum by a series of discrete fluid passageways.

7. An aircraft engine component according to claim 4, wherein said plenum provides sufficient compliance to reduce engine noise.

8. An aircraft engine component according to claim 4, wherein said component comprises a fan exit guide vane.

9. An aircraft engine component for reducing noise in turbofan engines, said component comprising a first aerodynamic surface, a second aerodynamic surface, and means for reducing noise without altering a pressure differential between the first aerodynamic surface and the second aerodynamic surface, said component having an airfoil portion and said noise reduction means comprising a porous element attached to a leading edge of said airfoil portion.

10. An aircraft engine component according to claim 9, wherein said component comprises a fan exit guide vane.

11. An aircraft engine comprising:
a rotor; and
a component downstream of said rotor, said component comprising a first aerodynamic surface, a second aerodynamic surface, and means for reducing noise without altering a pressure differential between the first aerodynamic surface and the second aerodynamic surface, said noise reducing means comprises said component having a plurality of cells, each said cell being bounded by one of said aerodynamic surfaces and having an opening for receiving a portion of a fluid flowing over said one aerodynamic surface, and means for preventing said fluid in said cells from flowing from said one aerodynamic surface to the other of said aerodynamic surfaces.

12. An aircraft engine according to claim 11, wherein said fluid flow preventing means comprises a contoured backing element positioned intermediate said aerodynamic surface.

13. An aircraft engine according to claim 11, wherein said component comprises a strut.

14. An aircraft engine according to claim 11, wherein said engine comprises a turbofan engine.

15. An aircraft engine comprising:
a rotor; and
a component downstream of said rotor, said component comprising a first aerodynamic surface, a second aerodynamic surface, and means for reducing noise without altering a pressure differential between the first aerodynamic surface and the second aerodynamic surface, wherein said noise reducing means comprises a plurality of openings in each of said aerodynamic surfaces, a plenum positioned in a space defined by said aerodynamic surfaces, and at least one fluid passageway connected to said openings and said plenum so that a portion of said fluid flowing over said aerodynamic surfaces is introduced into said plenum.

16. An aircraft engine according to claim 15, wherein said aerodynamic surfaces comprise an airfoil suction surface and an airfoil pressure surface.

17. An aircraft engine according to claim 15, wherein each of said holes is connected to the plenum by a series of discrete fluid passageways.

18. An aircraft engine according to claim 15, wherein said plenum provides sufficient compliance to reduce engine noise.

19. An aircraft engine according to claim 15, wherein said component comprises a fan exit guide vane.

20. An aircraft engine comprising:

a rotor; and a component downstream of said rotor, said component comprising a first aerodynamic surface, a second aerodynamic surface, and means for reducing noise without altering a pressure differential between the first aerodynamic surface and the second aerodynamic surface, wherein said component has an airfoil portion and said noise reducing means comprises a porous element attached to a leading edge of said airfoil portion.

21. An aircraft engine according to claim 20, wherein said component comprises a fan exit guide vane.

* * * * *